Oct. 24, 1933.     W. GROTE ET AL     1,931,895
APPARATUS FOR THE DETERMINATION OF SULPHUR
AND HALOGENS IN COMBUSTIBLE SUBSTANCES
Filed Jan. 13, 1933
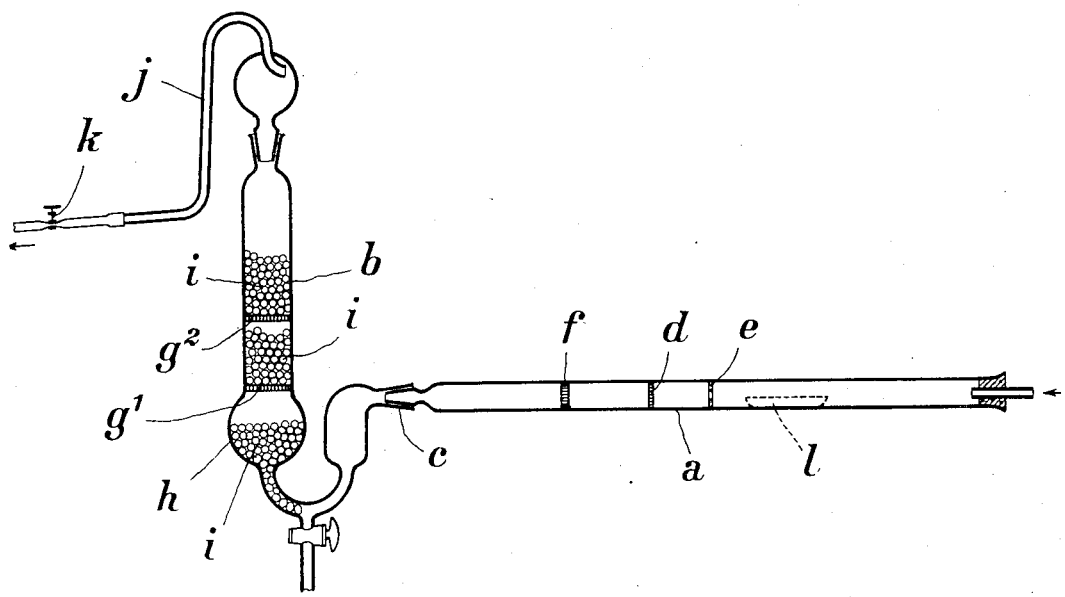
Inventors:
Wolfgang Grote
Heinz Kroleber Patented Oct. 24, 1933

1,931,895

UNITED STATES PATENT OFFICE 1,931,895

APPARATUS FOR THE DETERMINATION OF SULPHUR AND HALOGENS IN COMBUSTIBLE SUBSTANCES

Wolfgang Grote and Heinz Krekeler, Berlin, Germany, assignors to the firm of Jenaer Glaswerk Schott & Gen., Jena, Germany Application January 13, 1933, Serial No. 651,502, and in Germany May 3, 1930

4 Claims. (Cl. 23—259)

The present invention concerns an apparatus for the determination of sulphur and halogens in combustible, especially liquid or gaseous, substances which consists substantially of a quartz tube for the combustion of the substance to be examined and a receiver for the absorption of the sulphur or halogen compounds, subsequent to which the content of sulphur or halogens may be determined by means of one of the known methods.

According to the invention it is advantageous to fuse a quartz filter into the quartz tube. Not only does a filter of this kind effectively distribute the substance to be examined in the combustion air and, consequently, ensure a uniform and complete combustion, but it prevents a backward propagation of the combustion flame into that part of the quartz tube into which the substance to be examined is introduced.

The effective mixture of the combustion air and the substance to be examined prevents to a large extent the formation of soot. To avoid a transitory passage of soot into the absorption receiver, which may be due to incautious combustion, it is convenient to fuse another quartz filter into the quartz tube, i. e. between the first said filter and the receiver. Also it is advisable to fuse a perforated non-porous quartz plate in front of the said quartz filter, that is to say between this filter and the quartz tube aperture for the supply of the substance to be examined. This plate contributes to an effective mixture of the air and the combustible vapours of the substance to be examined and, at the same time, prevents the liquid, i. e. not yet evaporated, substance from flowing eventually to the first said filter plate.

To effectively distribute the gas current in the absorption receiver it is convenient to fuse a filter plate also into the receiver, as is the practice with gas washers. The repartition in the receiver is improved by disposing above this filter small glass bodies, for instance rings or balls, which prevent sprayed absorption liquid from being carried along by the current of gas. Below the filter fused into it, the receiver is conveniently widened, this widened part being filled by about one half with small glass bodies and, when in use, by part of the absorption liquid. The said widened part prevents the absorption liquid and the combustion gas current below the filter in the receiver from traversing the filter towards above. Another improvement in the repartition of the gas current in the absorption receiver is attained by fusing another filter above the first said filter of this receiver, also this other filter supporting small glass bodies. The absorption receiver may be used eventually also without the quartz tube. It may be applied to advantage, for instance, in calorimeter bottles, a proceeding which is frequently used when solid combustion substances are concerned. So far, however, this proceeding entailed the disadvantage of considerable losses, and this because when decreasing the compression of the oxygen from approximately 25 atmospheres to a lower pressure it was never quite sure whether all the sulphur trioxide could really be recovered in the absorption receiver.

It will be understood that the invention is not precisely restricted to apparatus consisting of quartz, but that any other material, for instance glass, may be used which lends itself to the aforesaid purpose.

The accompanying drawing, which illustrates the invention, represents a constructional example of the apparatus in a longitudinal section.

The apparatus consists of a quartz tube $a$ and an absorption receiver $b$ hermetically connected to the said tube. A quartz filter $d$ is fused into approximately the middle of the tube $a$. In front of this filter $d$ is a perforated non-porous quartz plate $e$ and behind, another quartz filter $f$, these parts $e$ and $f$ being fused into the quartz tube. Two filters $g^1$ and $g^2$ are fused into the receiver $b$. Below the filter $g_4$, the receiver $b$ is widened, this widened part $h$ being globular. Small glass balls $i$ are disposed in the widened part $h$ of the receiver $b$ and on the filters $g^1$ and $g^2$. To the receiver $b$ connects a pipe $j$ which may be narrowed or closed by means of a compressing screw $k$.

The apparatus works in the following manner. The substance to be examined, e. g. a naphtha product, is placed in a porcelain tray $l$ and introduced into the quartz tube $a$. The tray $l$ is heated from outside, and the consequent vapours, together with the combustion air, which is aspirated by the pipe $j$, flow in the direction to the absorption receiver $b$. Behind the filter $d$, the quartz tube $a$ is heated to such an extent that the mixture of naphtha vapours and combustion air ignites, the current of air having to be regulated in such a manner that the flame is not carried away from the filter $d$ (too much air) and will not give off soot (too little air). The combustion gases traverse the filter $f$ and arrive in the absorption receiver, which is filled, for instance, with a solution containing three percent of hydrogen peroxide, and in which the sulphur dioxide contained in the combustion gases is transformed to sulphuric acid. The sulphur content of this acid may be determined in the well-known manner.

We claim:

1. Apparatus for the determination of sulphur and halogens in combustible substances, comprising a quartz tube for the combustion of the material to be examined and an absorption receiver connected to the quartz tube, characterized by the feature that a quartz filter is fused into the quartz tube.

2. Apparatus according to claim 1, characterized by the feature that into that part of the quartz tube which lies between the said filter and the tube end connected to the absorption receiver is fused another quartz filter.

3. Apparatus according to claim 1, characterized by the feature that into that part of the quartz tube which lies between the first said filter and the aperture for the supply of the material to be examined is fused a perforated non-porous quartz plate.

4. An absorption receiver, a filter fused into this receiver, the receiver being widened below the said filter, and approximately half of the widened part being filled with small glass bodies.

WOLFGANG GROTE.
HEINZ KREKELER.